United States Patent [19]

Schrage et al.

[11] Patent Number: 5,221,718
[45] Date of Patent: Jun. 22, 1993

[54] PROCESS FOR THE PREPARATION OF COPOLYMERS CONTAINING NITRILE GROUPS BASED ON ETHYLENICALLY UNSATURATED MONOMERS

[75] Inventors: Heinrich Schrage; Hans-Josef Buysch; Hugo Vernaleken, all of Krefeld, Fed. Rep. of Germany

[73] Assignee: Bayer Aktiengesellschaft, Leverkusen, Fed. Rep. of Germany

[21] Appl. No.: 822,870

[22] Filed: Jan. 21, 1992

[30] Foreign Application Priority Data

Feb. 1, 1991 [DE] Fed. Rep. of Germany ....... 4102998

[51] Int. Cl.⁵ .............................................. C08F 8/30
[52] U.S. Cl. ................................ 525/377; 525/330.5; 525/378
[58] Field of Search ................................ 525/377, 378

[56] References Cited

U.S. PATENT DOCUMENTS 5,006,609 4/1991 Buback et al. ...................... 525/328

FOREIGN PATENT DOCUMENTS 0381973 8/1990 European Pat. Off. .

Primary Examiner—Bernard Lipman
Attorney, Agent, or Firm—Connolly & Hutz

[57] ABSTRACT

Copolymers containing nitrile groups based on ethylenically unsaturated monomers are prepared by reacting the copolymers on which they are based with ammonia at temperatures of from 150° to 270° C. and pressures from 30 to 350 bar in the presence of an aliphatic nitrile and/or dinitrile.

20 Claims, No Drawings

PROCESS FOR THE PREPARATION OF COPOLYMERS CONTAINING NITRILE GROUPS BASED ON ETHYLENICALLY UNSATURATED MONOMERS

The present invention relates to a process for the preparation of copolymers containing nitrile groups based on ethylenically unsaturated monomers.

U.S. Pat. No. 5,006,609 discloses a process for the preparation of copolymers containing nitrile groups based on ethylene, characterized in that a corresponding copolymer containing a predominant proportion of ethylene and minor proportions of an $\alpha,\beta$-unsaturated carboxylic acid ester is reacted with ammonia at temperatures from 120° to 280° C. and pressures from 150 to 2500 bar.

This process has, however, the disadvantage of requiring long reaction times and high pressures for technically acceptable conversion into the corresponding nitrile. Thus, for example, pressures of 1500 bar are employed in the example of the U.S. Patent Specification.

A process for the preparation of nitrile group-containing copolymers based on ethylenically unsaturated monomers (e.g., ethylenically unsaturated hydrocarbons) and built up of a) predominant proportions of structural units of the ethylenically unsaturated monomers, b) minor proportions of structural units corresponding to the following general formula

in which

R denotes hydrogen or a $C_1$–$C_4$-alkyl group and c) if desired, structural units derived from other comonomers(e.g., ethylenically unsaturated comonomers)

has now been found, which is characterized in that a copolymer used as basis, consisting of predominmonant proportions of ethylenically unsaturated monomers ethylenically unsaturated hydrocarbons), minor proportions of an $\alpha,\beta$-unsaturated carboxylic acid ester corresponding to the following general formula

$R^1$ stands for a $C_1$–$C_8$-alkyl group and, if desired, other comonomers (e.g., ethylenically unsaturated comonomers), is reacted with ammonia at temperatures of from 150° to 270° C. and pressures of from 30 to 350 bar in the presence of an aliphatic nitrile and/or dinitrile.

The reaction is preferably carried out at temperatures of from 180° to 250° C. and pressures of from 50 to 150 bar.

The proportion of ethylenically unsaturated monomers in the copolymers according to the invention is preferably from 55 to 95 mol-%, that of the units (I) is preferably from 5 to 40 mol-% and that of the units of other comonomers is preferably up to 40, in particular up to 20 mol-%. Copolymers of from 70 to 85 mol-% of ethylenically unsaturated monomers and from 10 to 25 mol-% of the units (I) are particularly preferred. The process according to the invention is carried out with basic copolymers of analogous composition corresponding to these molar ratios.

The ethylenically unsaturated monomers are preferably ethylene and styrene.

The copolymers to be used are known or may be prepared by known methods of radical polymerization with virtually any desired degree of polymerization. A degree of polymerization corresponding to average molar masses of from 20,000 to 250,000 is preferred.

The unsaturated carboxylic acid esters corresponding to the general formula (II) may be, for example, esters of acrylic acid and methacrylic acid, in particular the methyl esters, ethyl esters, propyl esters and butyl esters.

Other comonomers from which the copolymers according to the invention may be synthesized include, for example, higher olefins such as butene, pentene and hexene, unsaturated alcohols such as allyl alcohol and bifunctional monomers such as butadiene and isoprene.

The process according to the invention may also be controlled in such a manner that the reaction is not carried out to completion. The copolymers then obtained still contain an amide function or the original ester group.

The quantity of ammonia used in the process according to the invention depends on the desired degree of conversion of the ester and is therefore at least equimolar to the number of reacted groups. Since complete conversion is generally desired, it is advisable to use an up to 50 times excess of ammonia to accelerate the reaction. A 2 to 10 times excess of ammonia, based on the ester to be reacted, is preferably employed.

The nitriles to be added to the process according to the invention are in particular low molecular weight aliphatic nitriles and/or dinitriles such as acetonitrile, propionitrile, valeronitrile, butyric acid nitrile and/or succinic acid dinitrile, preferably acetonitrile.

The quantity of nitrile to be used should be at least equimolar to the number of ester groups but a 5 to 50 times excess is generally employed since the nitrile at the same time functions as solvent for the polymer and thus simplifies the course of the reaction. The excess can easily be recovered after the reaction.

Inert solvents such as toluene, tetrahydrofuran and/or dioxane may also be added to obtain a further lowering in the viscosity of the reaction mixture.

If conversion of the polymer containing ester groups to the corresponding nitrile is not sufficient, it may be completed by adding reactants which split off water. For this purpose, the reaction solution of the polymer is reacted pressure-free with a water-releasing reagent, optionally in the presence of a solvent, after discharge of the excess ammonia.

Thionyl chloride, phosgene, oxalyl chloride and/or phosphorus trichloride are examples of water releasing reagents, phosgene being preferred.

The water releasing reagents are generally used in a 2 to 10 times molar excess, based on the carbonamide groups still present. A 3 to 5 times excess is preferably employed. After termination of the reaction, the reagent may be recovered by distillation and used for further reactions.

The reaction is generally carried out by reacting a solution or suspension of the polymer with the water releasing reagent at elevated temperature, optionally in the presence of a catalyst.

The catalysts used may be dimethylformamide, dimethylacetamide and/or triphenylphosphine(oxide). The concentration of catalyst is normally from 0.01 to 5% by weight, based on the water releasing reagent.

Suitable solvents used for the water releasing reaction are those which have sufficient dissolving power for the polymer used and at the same time do not react with the water releasing reagent under the chosen reaction conditions. Acetonitrile, chlorobenzene, nitrobenzene and/or benzonitrile are examples.

In the after-reaction, the concentration of polymer, based on the quantity of solvent used, is generally from 3 to 25% by weight, preferably from 5 to 20% by weight.

The reaction may also be carried out with the undissolved polymer, for example in a kneader.

The reaction times for the after-reaction are about 2 to 16 hours; the reaction temperatures are from 20° to 180° C., preferably from 40° to 120° C.

The nitrile-group containing copolymers according to the invention may be used for the production of mouldings and films.

EXAMPLE 3 g of a randomly structured copolymer of ethylene and methyl acrylate (molar ratio 2.5:1) having an average molar mass of 240,000 were dissolved in a mixture of 15 ml of THF/acetonitrile (1:2) and reacted with 1.3 g of ammonia at 240° C. for 18 hours in an autoclave at 140 bar. IR analysis of the product showed complete conversion of the ester in addition to the nitrile band at 2236 cm$^{-1}$. The nitrogen and oxygen values of the polymer, determined by elementary analysis, indicated that 50% of nitrile groups and 50% of amide groups had formed in the polymer.

Complete conversion of the amide still present into nitrile could be achieved by reaction of the reaction solution with phosgene.

For this purpose, the solution of the copolymer obtained was reacted with 2 g of phosgene for 4 hours at 70° C. with the addition of 30 ml of chlorobenzene in the presence of 0.1 g of triphenylphosphine(oxide). The reaction product obtained could be precipitated, for example by stirring the reaction solution into methanol. Complete conversion to the corresponding nitrile was achieved, as already mentioned.

COMPARISON EXAMPLE (without the addition of a nitrile [acetonitrile])

The copolymer used in the above Example was dissolved in 15 ml of THF and reacted with 1.3 g of ammonia for 18 hours at 240° C. in an autoclave at 140 bar. IR analysis of the product showed no bands in the region of nitrile adsorption [from 2230 to 2240 cm$^{-1}$].

We claim:

1. A process for the preparation of a copolymer A containing nitrile groups, said copolymer A comprising
   a) predominant proportions of the structural units of ethylenically unsaturated hydrocarbons,
   b) minor proportions of structural units corresponding to the following general formula

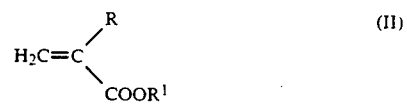

wherein
R denotes hydrogen or a $C_1$–$C_4$-alkyl group and
c) optionally, structural units derived from other ethylenically unsaturated comonomers, wherein a copolymer B used as a basis, obtained from predominant proportions of ethylenically unsaturated hydrocarbons, minor proportions of an α,β-unsaturated carboxylic acid ester corresponding to the following general formula

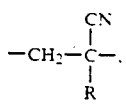

wherein
$R^1$ stands for a $C_1$–$C_8$-alkyl group
and, optionally, other ethylenically unsaturated comonomers, is reacted with ammonia at temperatures of from 150° to 270° C. and pressures of from 30 to 350 bar in the presence of at least one nitrile selected from an aliphatic nitrile and an aliphatic dinitrile.

2. The process according to claim 1, wherein for completing the reaction (complete conversion of the ester groups into nitrile groups), the copolymer A initially obtained is treated with water releasing reagents in an after-treatment, optionally in the presence of a catalyst and in the presence of solvents.

3. The process according to claim 2, wherein the after-treatment is carried out at 20° to 180° C.

4. A process for the preparation of a copolymer A containing nitrile groups, said copolymer A comprising
   a) predominant proportions of the structural units of ethylene,
   b) minor proportions of structural units corresponding to the following general formula

wherein
R denotes hydrogen or a $C_1$–$C_4$-alkyl group and
c) optionally, structural units derived from other ethylenically unsaturated comonomers, wherein a copolymer B used as a basis, obtained from predominant proportions of ethylene, minor proportions of an α,β-unsaturated carboxylic acid ester corresponding to the following general formula

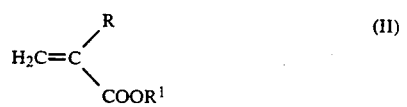

wherein
$R^1$ stands for a $C_1$–$C_8$-alkyl group
and, optionally, other ethylenically unsaturated comonomers, is reacted with ammonia at temperatures of from 150° to 270° C. and pressures of from 30 to 350 bar in the presence of at least one nitrile selected from an aliphatic nitrile and an aliphatic dinitrile.

5. The process according to claim 4, wherein for completing the reaction (complete conversion of the ester groups into nitrile groups), the copolymer A initially obtained is treated with water releasing reagents in an after-treatment, optionally in the presence of a catalyst and in the presence of solvents.

6. The process according to claim 5, wherein the after-treatment is carried out at 20° to 180° C.

7. The process according to claim 1, wherein said reaction is carried out at temperatures of from 180° to 250° C. and pressures of from 50 to 150 bar.

8. The process according to claim 1, wherein the copolymers containing nitrile groups comprise from 55 to 95 mol-% of said ethylenically unsaturated hydrocarbons, from 5 to 40 mol-% of said structural units corresponding to formula (I), and up to 40 mol-% of said structural units derived from other ethylenically unsaturated comonomers.

9. The process according to claim 8, wherein the copolymers containing nitrile groups comprise up to 20 mol-% of said structural units derived from other ethylenically unsaturated comonomers.

10. The process according to claim 1, wherein the copolymers containing nitrile groups comprise from 70 to 85 mol-% of said ethylenically unsaturated hydrocarbons, from 10 to 25 mol-% of said structural units corresponding to formula (I) and up to 20 mol-% of said structural units derived from other ethylenically unsaturated comonomers.

11. The process of claim 1, wherein said ethylenically unsaturated hydrocarbons comprise at least one monomer selected from ethylene and styrene.

12. The process of claim 1, wherein the unsaturated carboxylic acid esters corresponding to the general formula (II) comprise acrylic acid esters or methacrylic acid esters.

13. The process of claim 4, wherein the unsaturated carboxylic acid esters corresponding to the general formula (II) comprise acrylic acid esters or methacrylic acid esters.

14. The process of claim 12, wherein the acrylic acid esters or methacrylic acid esters comprise an ester selected from the group consisting of methyl esters, ethyl esters, propyl esters and butyl esters of acrylic acid or methacrylic acid.

15. The process of claim 13, wherein the acrylic acid esters or methacrylic acid esters comprise an ester selected from the group consisting of methyl esters, ethyl esters, propyl esters and butyl esters of acrylic acid or methacrylic acid.

16. The process of claim 1, wherein the other ethylenically unsaturated comonomers comprise at least one comonomer selected from the group consisting of higher olefins, unsaturated alcohols and bifunctional monomers.

17. The process of claim 3, wherein the other ethylenically unsaturated comonomers comprise at least one comonomer selected from the group consisting of higher olefins, unsaturated alcohols and bifunctional monomers.

18. The process of claim 1, wherein the at least one nitrile comprises at least one of acetonitrile, propionitrile, valeronitrile, butyric acid nitrile and succinic acid dinitrile.

19. The process of claim 3, wherein the at least one nitrile comprises at least one of acetonitrile, propionitrile, valeronitrile, butyric acid nitrile and succinic acid dinitrile.

20. A process for the preparation of a copolymer A containing nitrile groups, said copolymer A comprising
a) predominant proportions of the structural units of ethylenically unsaturated hydrocarbons, and
b) minor proportions of structural units corresponding to the following general formula

wherein
R denotes hydrogen or a $C_1$–$C_4$-alkyl group
and wherein
a copolymer B used as a basis, obtained from predominant proportions of ethylenically unsaturated hydrocarbons, and minor proportions of an $\alpha,\beta$-unsaturated carboxylic acid ester corresponding to the following general formula

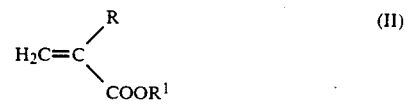

wherein
$R^1$ stands for a $C_1$–$C_8$-alkyl group,
is reacted with ammonia at temperatures of from 150° to 270° C. and pressures of from 30 to 350 bar in the presence of at least one nitrile selected from an aliphatic nitrile and an aliphatic dinitrile.

* * * * *